United States Patent Office 3,733,404
Patented May 15, 1973

3,733,404
ANTIBACTERIAL COMPOSITION CONTAINING
α-AMINOBENZYL PENICILLINS
Gilman N. Cyr, Piscataway, Charles Riffkin, Highland Park, and Carl B. Rifino, Lakewood, N.J., assignors to E. R. Squibb & Sons, Inc., New York, N.Y.
No Drawing. Filed Sept. 4, 1970, Ser. No. 69,967
Int. Cl. A61k 21/00
U.S. Cl. 424—114    5 Claims

ABSTRACT OF THE DISCLOSURE

Antibacterial compositions are provided comprising a mixture of ampicillin trihydrate and sodium ampicillin which is absorbed at a faster rate than ampicillin trihydrate alone and which does not have disadvantages associated with the use of sodium ampicillin alone. Further, antibacterial compositions are provided comprising a mixture of ampicillin and sodium ampicillin which does not have disadvantages associated with the use of sodium ampicillin alone.

BACKGROUND OF THE INVENTION

α-Aminobenzyl penicillin, hereafter called ampicillin, which has antibacterial activity against both gram-positive and gram-negative bacteria upon both parenteral or oral administration and which also exhibits resistance to destruction by acid, is disclosed in U.S. Pat. 2,985,648. While ampicillin possesses a broad spectrum of activity, the most widely-used sterile injectable form in this country to date has been the soluble sodium salt. The solution of this salt, however, has an extremely short shelf-life, about one hour, and the solution is irritating on injection. The irritation appears to be due to its high pH (8.5–9.0) and even buffered solutions are irritating.

Sterile crystals of ampicillin trihydrate usually occur in the form of long needles. In this form the ampicillin is dilatant and unuseable for preparing suspensions which are to be injected. Traditionally, insoluble solids have been micronized, for example, by air attrition mills or fluid energy mills, to reduce the particle size to from 5 to 10 microns. Typical examples are procaine penicillin G, various steroids, etc. Due to the amphoteric nature of ampicillin, however, extreme difficulties are encountered in preparing suspensions from micronized material. Even at low potency levels of about 200 mg./ml., the suspension is very viscous, foamy and difficult to handle.

U.S. application Ser. No. 831,225, now U.S. Pat. 3,703,511 discloses that when crystals of ampicillin trihydrate are reduced to an optimum particle size in the range of from about 5 microns to about 50 microns, the crystals no longer behave in a dilatant manner when suspended in water. The suspensions are stable for at least one year when stored under refrigeration, and, when administered to patients, provide effective ampicillin levels for more than twice as long as solutions of sodium ampicillin.

It has now been found that when ampicillin trihydrate is used parenterally in combination with sodium ampicillin, higher initial drug plasma levels of ampicillin are attained than with the trihydrate alone. Furthermore, use of the above combination and a combination of ampicillin, anhydrous and sodium ampicillin do not have disadvantages associated with use of sodium ampicillin alone.

In accordance with the present invention, antibacterial compositions are provided having a particle size in the range of from about 5 to about 100 microns comprising ampicillin trihydrate or ampicillin, anhydrous and sodium ampicillin. The combination of ampicillin trihydrate and sodium ampicillin reaches desired drug plasma levels within a short period of time, for example, in less than about 1 hour, and the desired drug plasma level is prolonged sufficiently to allow twice daily dosing.

The ampicillin trihydrate or ampicillin, anhydrous is employed in an activity or molar ratio to the sodium ampicillin of within the range of from about 99:1 to about 1:1 and preferably from about 4:1 to about 2:1.

The ampicillin starting material for preparing the hydrate and the sodium ampicillin may be prepared as described in U.S. Pat. No. 2,985,648. At temperatures below about 40° C. the ampicillin is present as ampicillin trihydrate. The ampicillin trihydrate is dissolved in water by reducing the pH to about 1.2, for example, by addition of concentrated HCl. After the ampicillin trihydrate is solubilized, it is sterilized, for example, by passing through a millipore filter. The filtrate is collected in a sterile vessel. The pH is then raised to from about 4.0 to about 5.0 by the addition of sterile 20% NaOH. In this pH range, substantially all of the ampicillin trihydrate is crystallized. The sterile crystals are separated, washed and dried aseptically. The ampicillin trihydrate crystals so produced have a particle size range of from about 5 microns to about 100 microns. Only a very small percentage of the crystals have a particle size below about 10 microns. The majority of the crystals, about 85%, have a particle size above about 20 microns, and within the range of from about 20 microns to about 100 microns. The yield is approximately 80% or higher.

The ampicillin trihydrate crystals are next reduced to a useful particle size in the range of from about 5 microns to about 50 microns by, for example, aseptic micropulverization. Micropulverization or mechanical grinding produces a product which has a larger particle size range than that made by either attrition mills or fluid energy mills. At least 50% of the material, and preferably at least 70%, should have a particle size in the range of from about 20 microns to about 50 microns. This particle size material yields a more manageable suspension which can be formulated to higher potencies. This is desirable from the standpoint of medical practice since it reduces the size of the injection and still provides an adequate dosage regimen.

The ampicillin, anhydrous suitable for use herein should have a particle size of within the range of from about 5 to about 50 microns and preferably from about 20 to about 50 microns.

The sterile ampicillin trihydrate or ampicillin, anhydrous and sodium ampicillin combination may be stored as a mixture or separately as a powder, or as a dry mixture containing other sterile excepients such as, for example, suspending agents and dispersing agents. A suitable dispersing agent is lecithin, and a suitable suspending agent is sodium carboxymethylcellulose.

In preparing a combination of the invention, the ampicillin, anhydrous or trihydrate having a paticle size in the range of from about 5 microns to about 50 microns is combined with the sodium ampicillin and reconstituted with water for injection to form a suspension having from about 250 to about 550 mg. of ampicillin activity (as determined by biological assay) per ml.

Suspensions of the ampicillin trihydrate and sodium ampicillin of the present invention are long acting and produce high blood levels of ampicillin for prolonged periods of time. This prolonged effectiveness reduces the number of injections required in therapeutic treatment.

The sterile suspensions of the present invention are intended to be applied parenterally, for example, by subcutaneous or intramuscular injection.

The following examples illustrate the present invention without, however, limiting the same thereto.

EXAMPLE 1

Ampicillin trihydrate (1.2 kg.) is dissolved in water (12 liters) by reducing the pH to about 1.2 by addition of concentrated HCl, passed through a millipore filter, type GS, and the filtrate collected in a 20 liter sterile bottle. Ampicillin trihydrate is precipitated by raising the pH to about 4.3 by addition of sterile 20% NaOH. The sterile crystalline precipitate is separated, washed with sterile water for injection (2–3 liters), then with sterile acetone (1–2 liters) and vacuum dried. The yield is approximately 83% of ampicillin trihydrate needle-like crystals having a particle size range of from about 5 to about 100 microns, the majority of the crystals having a particle size above 50 microns.

The sterile needle crystals of ampicillin trihydrate are ground in a micropulverizer, type CF (American Marietta Co.), fitted with an 027 round screen. Alternatively, a tornado mill or hammer mill may be used, equipped with appropriate size mesh screen.

80 parts of sterile ampicillin trihydrate crystals, prepared as disclosed in Example 1, are aseptically blended with about 20 parts of sterile sodium ampicillin crystals, 8.9 parts lecithin and 0.135 part sodium carboxy methylcellulose. The sterile powder blend is then aseptically filled into sterile vials for use as an intramuscular injection, after reconstitution with sterile water or saline.

EXAMPLE 2

85 parts of sterile ampicillin, anhydrous prepared as described in U.S. Pat. No. 2,985,648 is aseptically blended with about 15 parts of sterile sodium ampicillin crystals, 8.9 parts of lecithin and 0.135 part of sodium carboxymethyl cellulose. The sterile powder blend is then aseptically filled into sterile vials for use as an intramuscular injection, after reconstitution with sterile water or saline.

What is claimed is:

1. An antibacterial composition comprising sterile sodium ampicillin and sterile ampicillin trihydrate having a particle size in the range of from about 5 microns to about 50 microns, at least 50% of the ampicillin trihydrate having a particle size in the range of from about 20 microns to about 50 microns, wherein ampicillin trihydrate is employed in an activity ratio to the sodium ampicillin of within the range of from about 4:1 to about 1:1.

2. Antibacterial compositions according to claim 1 in combination with a suspending agent and a dispersing agent.

3. A composition according to claim 2 wherein the dispersing agent is lecithin.

4. A composition according to claim 2 wherein the suspending agent is sodium carboxymethylcellulose.

5. A composition according to claim 1 wherein ampicillin trihydrate is employed in an activity ratio to the sodium ampicillin of within the range of from about 4:1 to about 2:1.

References Cited

UNITED STATES PATENTS 3,157,640 11/1964 Johnson et al. _____ 260—239.1
3,317,389 5/1967 Granatek et al. _____ 424—271

JEROME D. GOLDBERG, Primary Examiner